(12) United States Patent
Fujiwara

(10) Patent No.: US 7,183,837 B2
(45) Date of Patent: Feb. 27, 2007

(54) CHARGE PUMP CIRCUIT WITH LATCH-UP PREVENTION

(75) Inventor: Hirofumi Fujiwara, Shiga (JP)

(73) Assignee: NEC Electronics Corporation, Kanagawa (JP)

( * ) Notice: Subject to any disclaimer, the term of this patent is extended or adjusted under 35 U.S.C. 154(b) by 84 days.

(21) Appl. No.: 11/017,854

(22) Filed: Dec. 22, 2004

(65) Prior Publication Data

US 2005/0140426 A1    Jun. 30, 2005

(30) Foreign Application Priority Data

Dec. 25, 2003  (JP) ............................. 2003-428795

(51) Int. Cl.
*G05F 3/16*  (2006.01)
(52) U.S. Cl. .................. 327/537; 327/535; 363/60
(58) Field of Classification Search ................. None
See application file for complete search history.

(56) References Cited

U.S. PATENT DOCUMENTS

| | | | |
|---|---|---|---|
| 4,797,899 A * | 1/1989 | Fuller et al. ............... 375/219 |
| 5,640,123 A * | 6/1997 | Akaogi et al. ............. 327/534 |
| 5,917,354 A * | 6/1999 | Nakai et al. ............... 327/198 |
| 5,942,932 A * | 8/1999 | Shen ......................... 327/530 |
| 6,741,118 B2* | 5/2004 | Uchikoba et al. .......... 327/541 |
| 7,031,219 B2* | 4/2006 | Hsu et al. .................. 365/226 |

FOREIGN PATENT DOCUMENTS

JP    6-165482    6/1994

* cited by examiner

*Primary Examiner*—Timothy P Callahan
*Assistant Examiner*—Terry L. Englund
(74) *Attorney, Agent, or Firm*—McGinn IP Law Group, PLLC

(57) ABSTRACT

In an embodiment of the invention, a charge pump circuit has a latch-up prevention circuit. The latch-up prevention circuit has a depletion P-channel MOS transistor and a resistor serially connected with each other between a negative output terminal and a ground terminal. A first bidirectional PNP-transistor is connected between a back gate of the depletion MOS transistor and the ground terminal. A second bidirectional PNP-transistor is connected between the back gate of the depletion MOS transistor and the negative output terminal. A third bidirectional PNP-transistor is between the ends of the resistor to bypass it. The base of the first bidirectional PNP-transistor is connected to the negative output terminal, the gate of the depletion MOS transistor and the bases of the second and third bidirectional PNP-transistors are connected to the ground terminal.

16 Claims, 6 Drawing Sheets

CHARGE PUMP CIRCUIT WITH LATCH-UP PREVENTION

BACKGROUND OF THE INVENTION

1. Field of the Invention

The present invention relates to a charge pump circuit, particularly to prevention of the latch-up of the charge pump circuit.

2. Description of Related Art

A charge pump circuit generating from a single power supply voltage positive and negative output voltages whose absolute values are larger than the supply voltage is widely used. An example of such a charge pump circuit, for example, is disclosed in Japanese Unexamined Patent Application Publication No. 6-165482. Referring to FIG. 6, there is illustrated a conventional charge pump circuit 100 including a positive voltage generating circuit 110 and a negative voltage generating circuit 120. Connecting a power source between an input terminal 1 and a ground terminal 2 to supply power source voltage VDD causes the positive voltage generating circuit 110 to generate a positive voltage (+2VDD) twice of the power source voltage VDD. The positive voltage (+2VDD) is provided to the negative voltage generating circuit 120. The negative voltage generating circuit 120 generates a negative voltage (−2VDD) twice of the power source voltage VDD using the positive voltage (+2VDD). The positive voltage (+2VDD) is output between a positive output terminal 3 and the ground terminal 2 and the negative voltage (−2VDD) is output between a negative output terminal 4 and the ground terminal 2.

The positive voltage generating circuit 110 includes the switches S11–S14 and the capacitors C11, C12. The capacitor C11 is charged with the power source voltage VDD from the input terminal 1 when the switches S11, S12 are on and the switches S13, S14 are off. Subsequently, the switches S11, S12 are turned off and the switches S13, S14 are turned on to discharge the capacitor C11. The capacitor C12 is charged with the power source voltage VDD plus the charged voltage of the capacitor C11. Switching alternatively the switches S11, S12 and the switches S13, S14 charges the capacitor C12 and the positive voltage generating circuit 110 supplies the positive voltage (+2VDD) twice of the power source voltage VDD to the negative voltage generating circuit 120 and the positive output terminal 3.

The negative voltage generating circuit 120 includes the switches S21–S24 and the capacitors C21, C22. The positive voltage supplied from the positive voltage generating circuit 110 charges the capacitor C21 when the switches S21, S22 are on and the switches S23, S24 are off. Subsequently, when the switches S21, S22 are turned off and the switches S23, S24 are turned on, the capacitor C21 discharges and the capacitor C22 is charged. A switching alternatively the switches S21, S22 and the switches S23, S24 is repeated as such to charge the capacitor C21 allowing the negative voltage generating circuit 120 to provide the negative output terminal with the negative voltage twice of the power source voltage VDD (−2VDD).

FIG. 7 illustrates an example of the charge pump circuit 100 using MOS transistors for the switches S11–S14 and S21–24. Enhancement P-channel MOS transistors designated as M11, M13, M14, M21 correspond to the switches S11, S13, S14, S21, respectively. Enhancement N-channel MOS transistors designated as M12, M22–24 correspond to the switches S12, S22–24, respectively. The gates of the MOS transistors are designated as G11, G12, G13, G14, G21, G22, G23, and G24, respectively. In the positive voltage generating circuit 110, when the MOS transistors M11, M12 are turned on and the MOS transistors M13, M14 are turned off, the capacitor C11 is charged with the power source voltage VDD. When the MOS transistors M11, M12 are turned off and the MOS transistors M13, M14 are turned on, the capacitor C11 is discharged and the capacitor C12 is charged with the power source voltage VDD plus the voltage of the charged capacitor C11.

In the negative voltage generating circuit 120, when the MOS transistors M21, M22 are turned on and the MOS transistors M23, M24 are turned off, the capacitor C21 is charged. Subsequently, when the MOS transistors M23, M24 are turned on and the MOS transistors M21, M22 are turned off, the capacitor C22 is charged with the charges from the discharged capacitor C21. An electrostatic discharge protection diode Di is connected between the input terminal 1 and the positive output terminal 3.

The charge pump circuit 100 illustrated in FIG. 7 is integrated in a single semiconductor substrate with external capacitors. For example, using a P-substrate, each N-channel MOS transistor M12, M22–24 is configured with the back gate of the P-substrate and the source/drain of N-regions on the P-substrate. Each P-channel MOS transistor M11, M13, M14, M21 is consisted of the back gate of N-well on the P-substrate and the source/drain of P-regions in N-well. Hence, the voltage of the P-substrate is the voltage of the negative output terminal 4. The diode Di configured with the cathode of N-well on the P-substrate 11 and the anode of a P-region in the N-well.

It has now been discovered that the charge pump circuit 100 integrated in a semiconductor substrate has parasitic transistors FIG. 8 depicts the main part of the charge pump circuit 100. The MOS transistor M12 has the source/drain of the N-regions 12, 13. The gates of the MOS transistors are designated as G12 and G13, respectively. There are formed N-well 14, 15 on the P-substrate. P-regions 16, 17 formed in the N-well 14 form the source/drain of the MOS transistor M13. The P-region 18 formed in the N-well 15 constitutes the diode Di. The N-region 12, that is the source of the MOS transistor M12, is grounded. The N-region 13, that is the drain of the MOS transistor M12, is connected to the P-region 17 that is the drain of the MOS transistor M13. The P-region 16, that is the source of the MOS transistor M13, is connected to the input terminal 1. The N-well 14 is connected to the positive output terminal 3. The P-substrate 11 is connected to the negative output terminal 4.

At the moment of applying the power source voltage VDD to the input terminal 1 on the start-up of the charge pump circuit 100, forward current flows between the P-region 18 constituting the diode Di and the N-well 15 or between the P-region 16 constituting the MOS transistor M13 and the N-well 14. As a result, the positive output terminal voltage is raised toward VDD.

Since the voltage of the P-substrate 11 is floating, a parasitic PNP-transistor Qp1 which is consisted of the P-region 18, the N-well 15 constituting the diode Di and the P-substrate 11 is turned on. Also turned on is a parasitic PNP-transistor Qp1 which is consisted of the P-region 16 constituting the MOS transistor M13, the N-well 14 and the P-substrate 11. As a result, the P-substrate 11 voltage is raised toward VDD.

The rise of the P-substrate voltage turns on a parasitic NPN-transistor Qp2 which is consisting of the N-well 15 constituting the diode Di, the P-substrate 11 and the grounded N-region 12 which is the source of the MOS transistor M12. It also turns on a parasitic NPN-transistor Qp2 consisting of the N-well 14 constituting the MOS transistor M13, the P-substrate 11 and the grounded N-region 12.

As a result, the parasitic transistors Qp1, Qp2 operate as a thyristor. A large current flows between the input terminal 1 and the ground terminal 2 prohibiting the start of the charge pump circuit 100. For starting the charge pump circuit 100 normally, it is required to connect a schottky diode between the input terminal 1 and the positive output terminal 3 or between the negative output terminal 4 and the ground terminal 2. The schottky diode has the forward voltage Vf smaller than the forward voltage between the P-region 16, 18 and the N-well 14, 15 or between the P-substrate 11 and the N-region 12 to keep the parasitic PNP-transistors Qp1 off. It, however, leads to increase of external parts and implementation area.

SUMMARY OF THE INVENTION

An embodiment of the invention is a charge pump circuit integrated in a semiconductor substrate generating a first output voltage and a second output voltage from an input voltage, a sign of the first output voltage being the same as the input voltage, a sign of the second output voltage being different from the input voltage, and absolute values of the output voltages are larger than the input voltage, the charge pump circuit. It comprises an output terminal of the second output voltage, a latch-up prevention circuit embedded in the semiconductor substrate including a depletion MOS transistor connecting the output terminal to ground at startup.

Another embodiment of the invention is a charge pump circuit generating an output voltage from an input voltage. It comprises an input terminal receiving an input voltage, an output terminal outputting an output voltage. It also has a voltage generating circuit generating and providing the output voltage to the output terminal, a sign of the output voltage being different from the input voltage and an absolute value of the output voltage being larger than the input voltage. It further comprises a latch-up prevention circuit embedded in a semiconductor substrate. It connects the output terminal to ground on condition that the voltage of the output terminal reaches a predetermined voltage to prevent increase of the voltage of the output terminal and thyristor operation of parasitic transistors.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
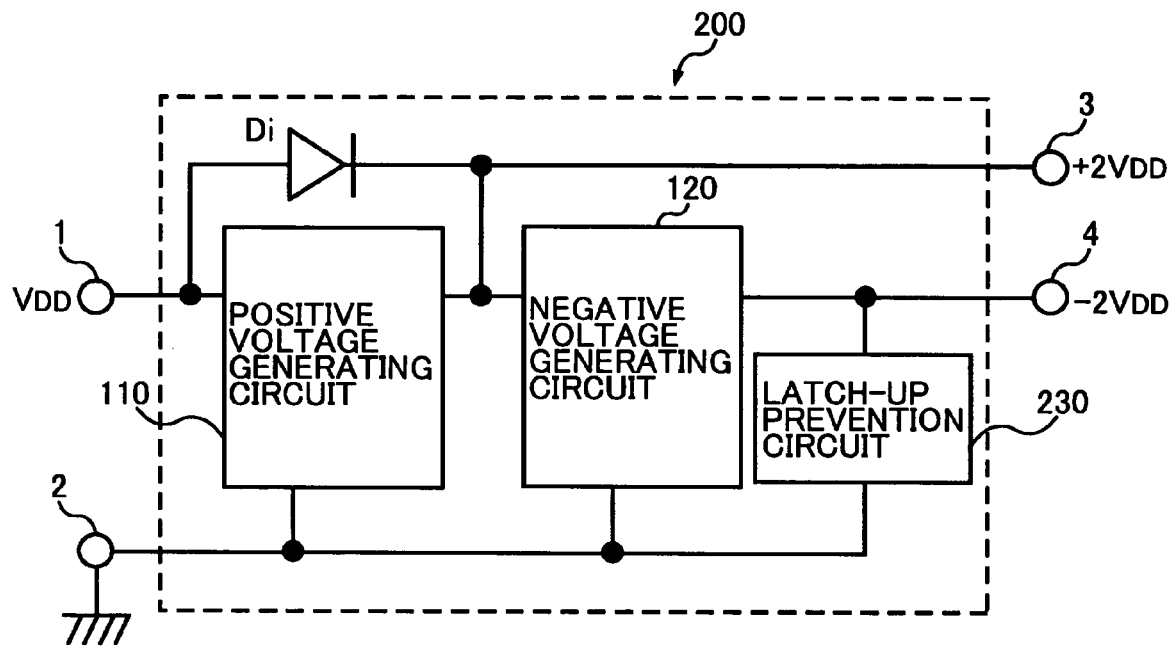
FIG. 1 is a block diagram illustrating a charge pump circuit as an embodiment of the present invention.

Exemplary embodiments of the invention are explained by referring to the drawings. A charge pump circuit of an embodiment generates the output voltage from the input voltage. It has a voltage generating circuit generating and providing the output voltage to the output terminal. The sign of the output voltage is different from the input voltage and the absolute value of the output voltage is larger than that of the input voltage. For example, the input voltage is positive and the output voltage is negative. It also has a latch-up prevention circuit embedded in a semiconductor substrate to connect the output terminal to ground on condition that the voltage of the output terminal reaches a predetermined voltage. It prevents the increase of the voltage of the output terminal and thyristor operation of parasitic transistors. Hence, the latch-up of the charge pump circuit is prevented by the internal latch-up prevention circuit and the external parts are not required.

The latch-up prevention circuit preferably includes a depletion transistor to connect the output terminal to the ground in accordance with the voltage of the output terminal. It connects the output terminal to the ground according to a back gate voltage which varies in accordance with the voltage of the output terminal. As the depletion transistor starts the operation earlier than enhancement transistors, sure prevention of the latch-up is achieved. A latch-up prevention circuit of the embodiment is especially useful in a charge pump circuit generating both the positive voltage and the negative voltage from the input voltage in which the voltage of the output terminal whose sign is different from the input voltage tends to be pulled toward the input voltage.

Figure 6:
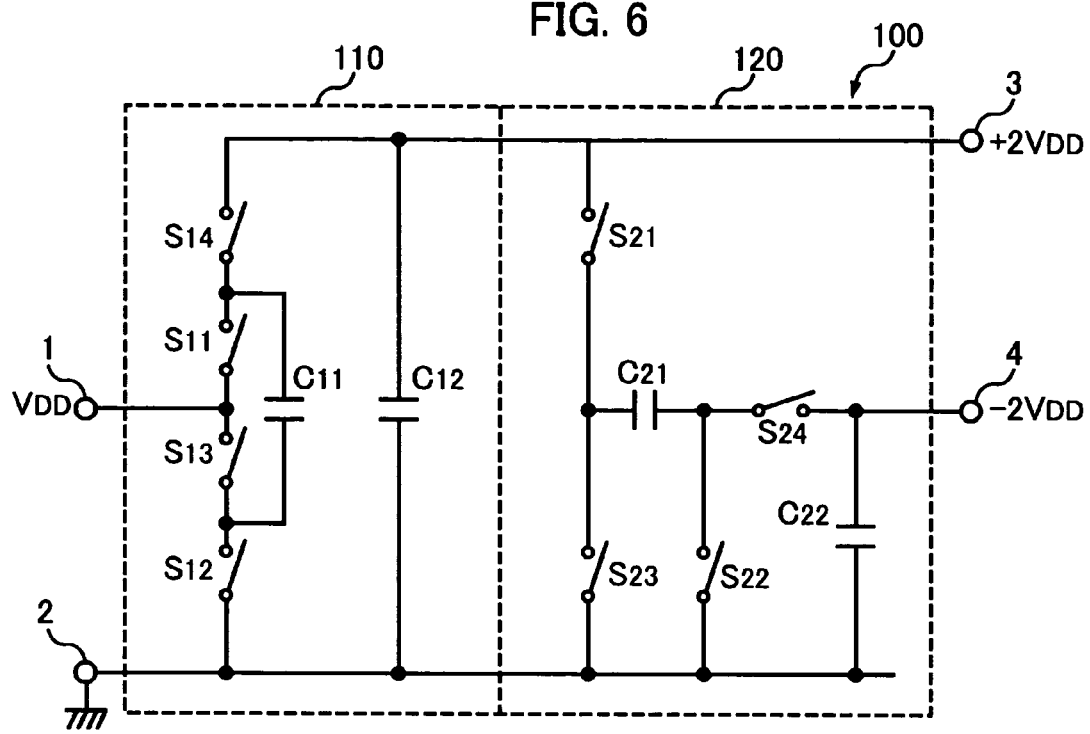
FIG. 6 is a circuit diagram of a conventional charge pump circuit
Figure 7:
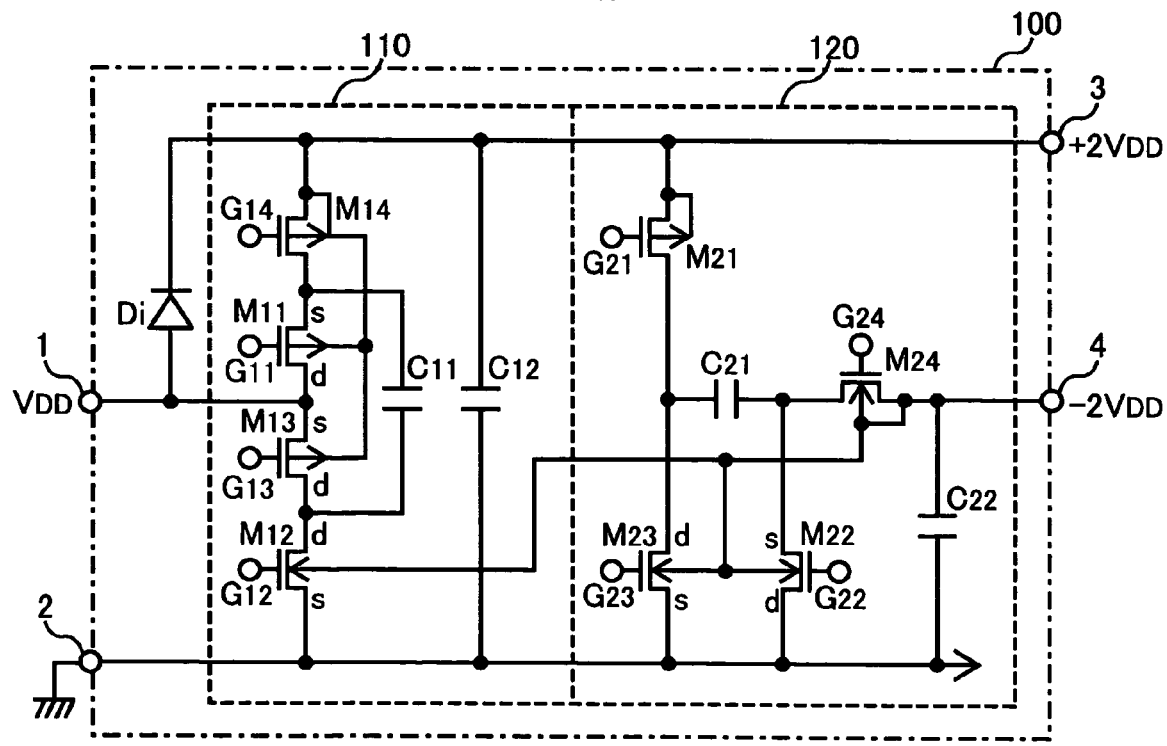
FIG. 7 is a circuit diagram of a conventional charge pump circuit in FIG. 6 using MOS transistors for switches.
Figure 8:
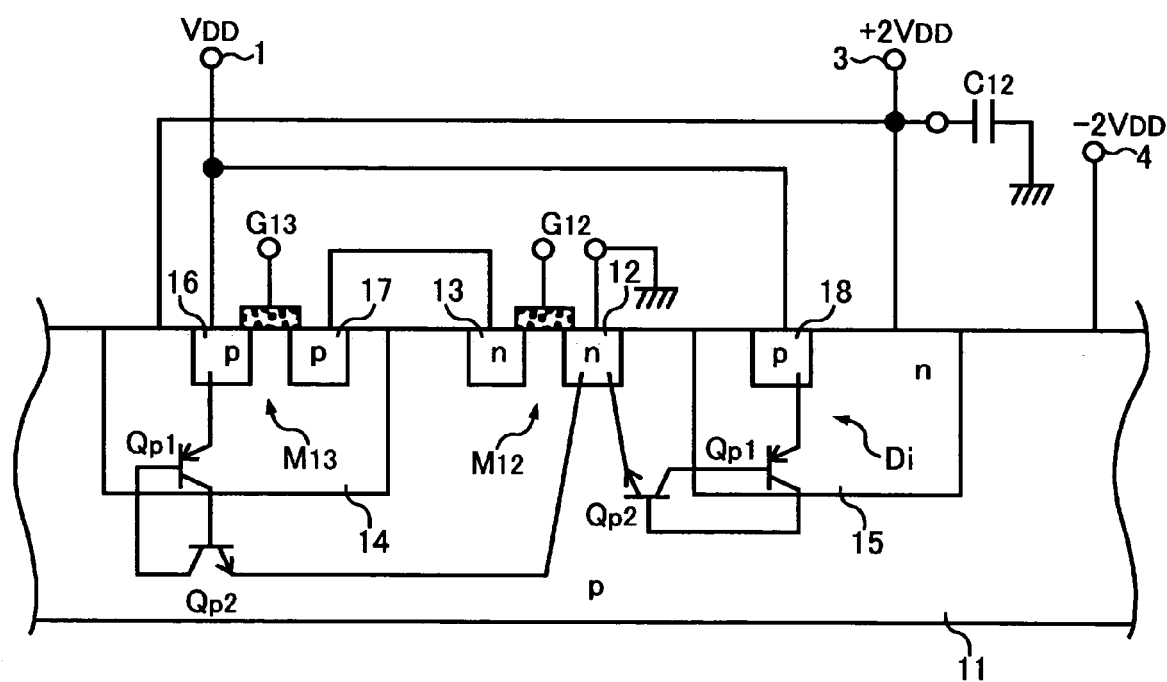
FIG. 8 is a sectional view of the main part of the charge pump circuit in FIG. 7 implemented in an integrated circuit formed on a semiconductor substrate.

Referring now to FIG. 1, there is illustrated a charge pump circuit 200 as an embodiment of the present invention. In FIG. 1, some elements substantially the same as the elements in FIGS. 6 and 7 are designated using the same references and the explanation is omitted. One of features different from the charge pump circuit 100 illustrated in FIGS. 6 and 7 is a latch-up prevention circuit 230 connected between a negative output terminal 4 and a ground terminal 2.

Figure 2:
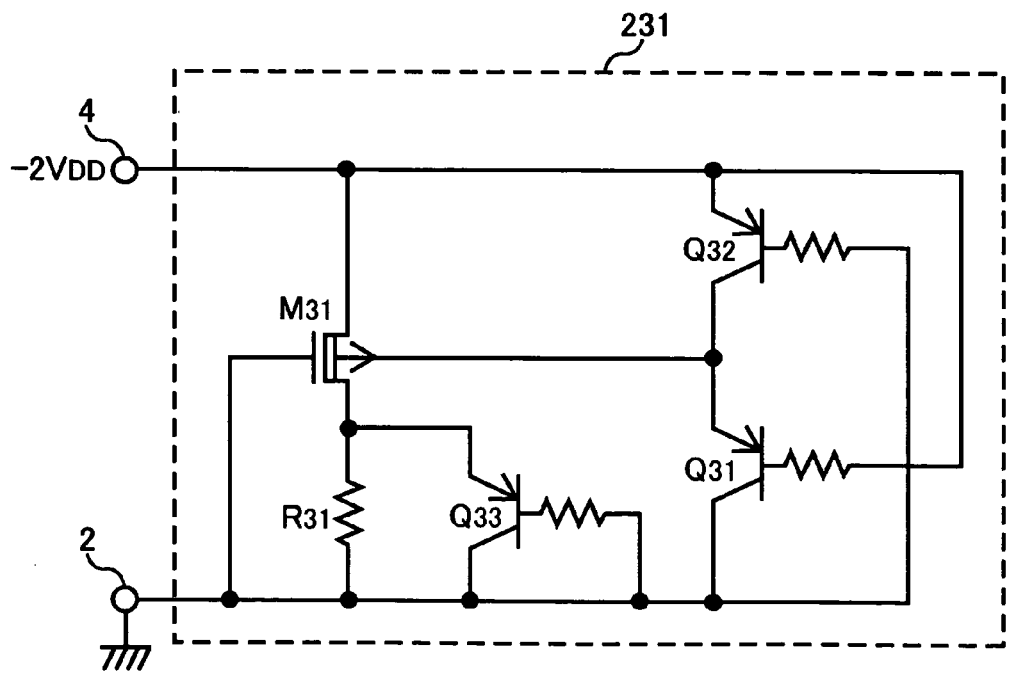
FIG. 2 is a circuit diagram of a latch-up prevention circuit of the charge pump circuit formed in a P-substrate.

FIG. 2 illustrates the latch-up prevention circuit 231 in which a P-substrate is the back gate of each N-channel MOS transistor and N-well on the P-substrate forms the back gate of each P-channel MOS transistor. A depletion P-channel MOS transistor M31 and a resistor R31 are serially connected between the negative output terminal 4 and the ground terminal 2. A bidirectional PNP-transistor Q31 is connected between the back gate of the MOS transistor M31 and the ground terminal 2 and a bidirectional PNP-transistor Q32 is connected between the back gate of the MOS transistor M31 and the negative output terminal 4 to connect the back gate of the MOS transistor M31 alternatively to the negative output terminal 4 or the ground terminal 2. A bidirectional PNP-transistor Q33 is connected with both ends of the resistor 31 to bypass (short-circuit) the resistor 31. The base of the transistor Q31 is connected to the negative output terminal 4. The gate of the MOS transistor M31, the base of the transistor Q32 and the base of the transistor Q33 are connected to the ground terminal 2.

Referring now to FIGS. 3A, 3B, 4A and 4B, the operation of the latch-up prevention circuit 231 is explained.

Figure 3A:
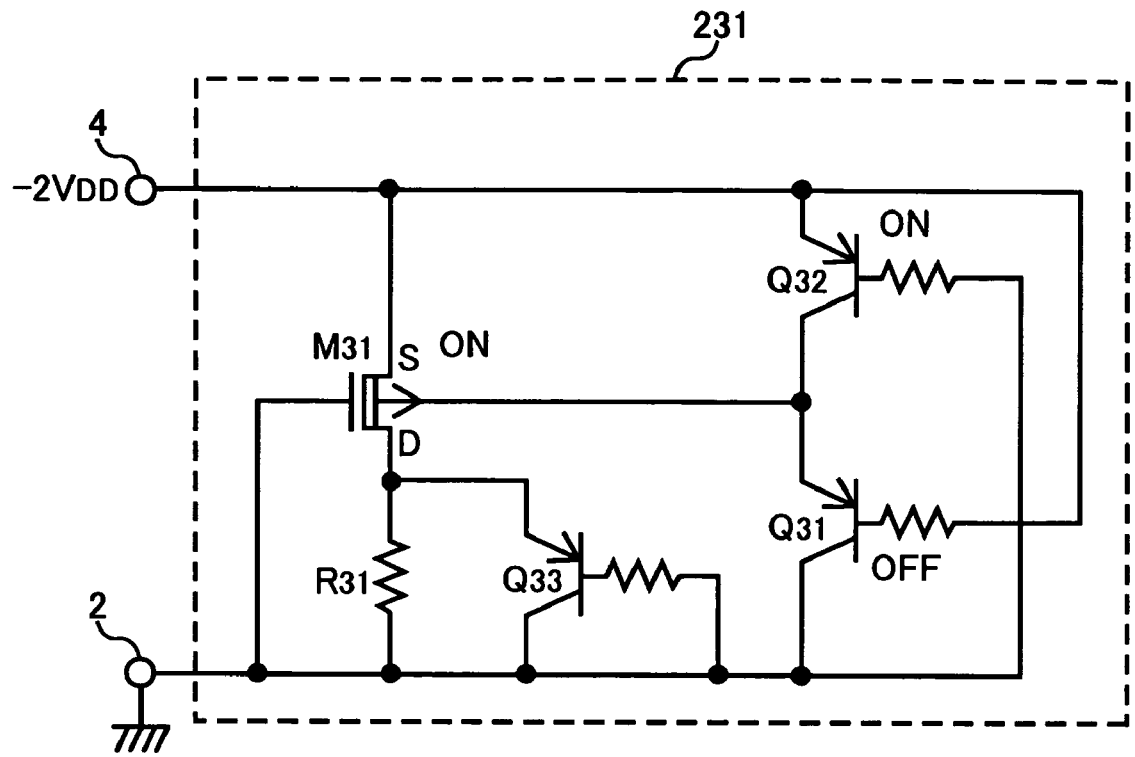
FIGS. 3A and 3B depict the operation of the latch-up prevention circuit in FIG. 2 when the voltage of the negative output is raised toward VDD.
Figure 3B:
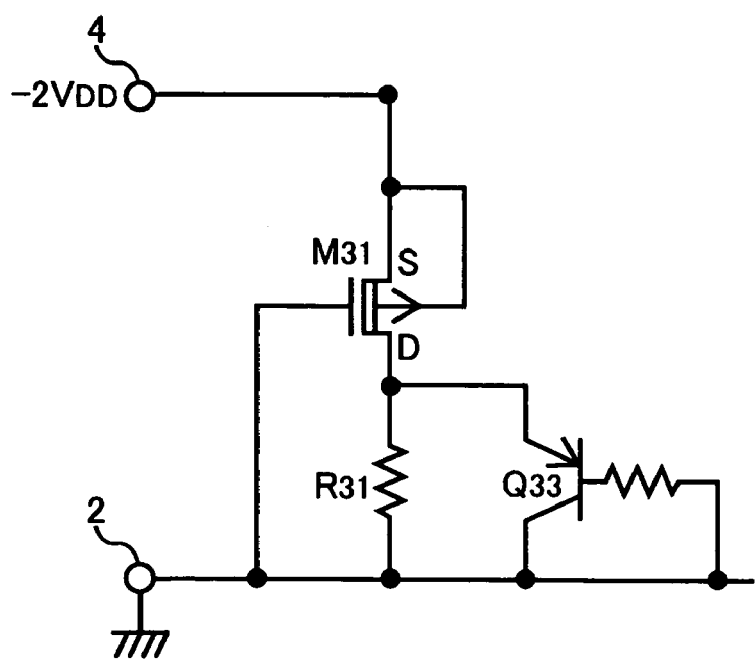

Referring to FIGS. 3A, 3B, when the power source voltage VDD is applied to the input terminal 1 of the charge pump circuit 200, forward currents flow across an electrostatic discharge protection diode Di and parasitic diodes and the voltage of a positive output terminal 3 is raised toward VDD. Then, the voltage of the negative output terminal 4 is raised toward VDD.

When the base-emitter voltage VBE of the transistor Q32 rises and becomes equal or greater than the collector-emitter saturation voltage VCE (SAT) (nearly equals 0.2V), the transistor Q32, as shown in FIG. 3A, starts to turn on with high impedance. Referring to FIG. 3B, the back gate of the MOS transistor M31 is now connected to the negative output terminal 4. A side of the MOS transistor M31 connected to the negative output terminal 4 forms the source and the other side of the MOS transistor M31 connected to the ground terminal 2 forms the drain.

As the gate-source voltage VGS of the MOS transistor M31 is equal or less than the threshold voltage VDT of the MOS transistor M31 (VDT is positive and VGS is negative), MOS transistor M31 is on and the negative output terminal 4 is connected to the ground terminal 2 via the resistor R31. The transistor Q33 is turned on when it is biased between the base and the emitter and the base-emitter voltage VBE rises. The voltage across the resistor R31 becomes equal to the turn on voltage of the transistor Q33.

As result, the negative output terminal 4 is connected to the ground terminal 2 with low impedance via the turn on voltages of the transistor M31 and the transistor Q33. The voltage of the negative output terminal 4 from the ground level does not rise over the turn on voltage of the transistor M31 plus the turn on voltage of the transistor Q33. Hence, the parasitic transistors Qp1 and Qp2 do not turn on and the parasitic transistor Qp1, Qp2 do not operate as a thyristor.

Figure 4A:
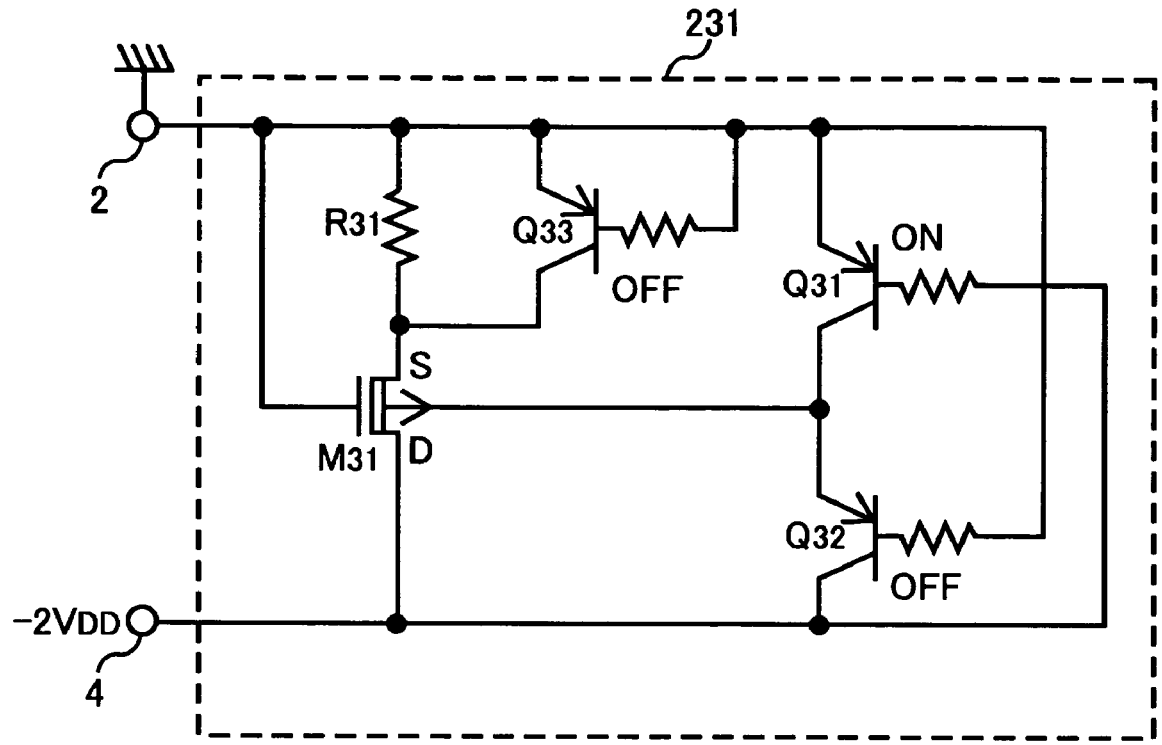
FIGS. 4A and 4B depict the operation of the latch-up prevention circuit in FIG. 2 when the voltage of the negative output is lowered toward a negative voltage.
Figure 4B:
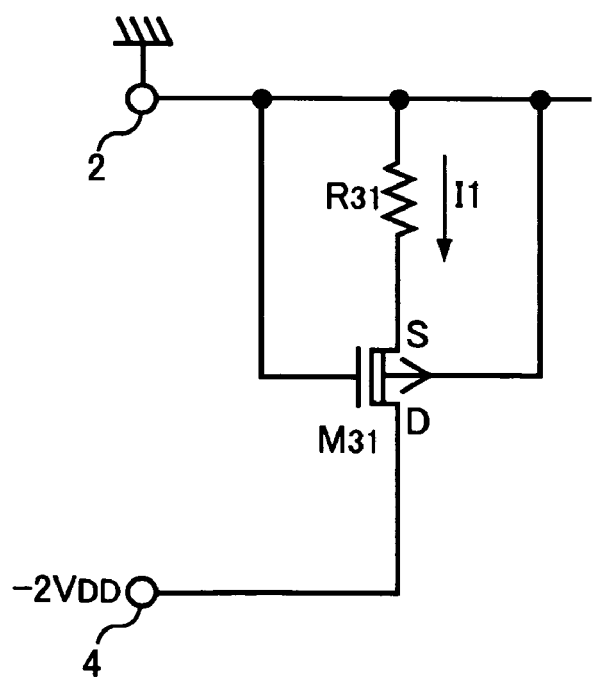

Referring to FIGS. 4A and 4B, as the power source voltage VDD is applied to the input terminal 1 of the charge pump circuit 200, and the positive voltage generating circuit 110 and the negative voltage generating circuit 120 starts, the voltage of the negative output terminal is lowered toward the negative voltage (−2VDD). As the MOS transistor M31 is normally-on, it is in the on-state until the voltage of the negative output terminal 4 is lowered to a specific value.

The MOS transistor M31 turns to the on-state with high impedance from the on-state with low impedance when the voltage of the negative output terminal 4 is lowered below the specific value. As illustrated in FIG. 4A, when the voltage of the negative output terminal 4 becomes negative and the base-emitter voltage VBE of the transistor Q31 becomes equal or greater than the collector-emitter saturation voltage VCE (SAT) (≈0.2V) of the transistor Q31, the transistor Q31 starts to turn on with high impedance. As illustrated in FIG. 4B, the back gate of the transistor M31 is connected to the ground terminal 2. The ground terminal side of the MOS transistor M31 forms the source and the negative output terminal side of the MOS transistor M31 forms the drain. The transistor Q33 is off since the base and emitter are grounded. The source of the MOS transistor M31 is grounded via the resistor R31.

Referring to the equivalent circuit shown in FIG. 4B, when the voltage of the negative output terminal 4 is lowered in the negative voltage direction, a current I1 via the MOS transistor M31 flows across the resistor R31 and render the source voltage of the transistor M31 V1= (R31*I1) below ground (ground-V1). Hereby, the gate-source voltage VGS of the MOS transistor M31 becomes equal to V1. The voltage drop V1=R31*I1 is also applied to between the back gate and source of the MOS transistor M31. When assuming the threshold voltage change (drop) due to the back gate effect is ΔVTD, the condition in which the MOS transistor M31 is turned off is (VTD−ΔVTD) <VGS=V1.

Therefore, when V1 goes close to (VTD−ΔVTD), the MOS transistor M31 decreases the current flow. On the other hand, as the current flow through the MOS transistor M31 decreases, the current across the resistor R31 decreases giving the MOS transistor M31 the negative feedback to increase the current flow. As a result, the gate-source voltage VGS of the MOS transistor M31 converges to a constant value in the equilibrium state and the MOS transistor M31 turns to an on-state with high impedance. When the MOS transistor M31 is in the on-state with high impedance, the voltage of the negative output terminal 4 is lowered furthermore in the negative voltage direction and reaches the negative voltage (−2VDD) twice of the power source voltage VDD.

Figure 5:
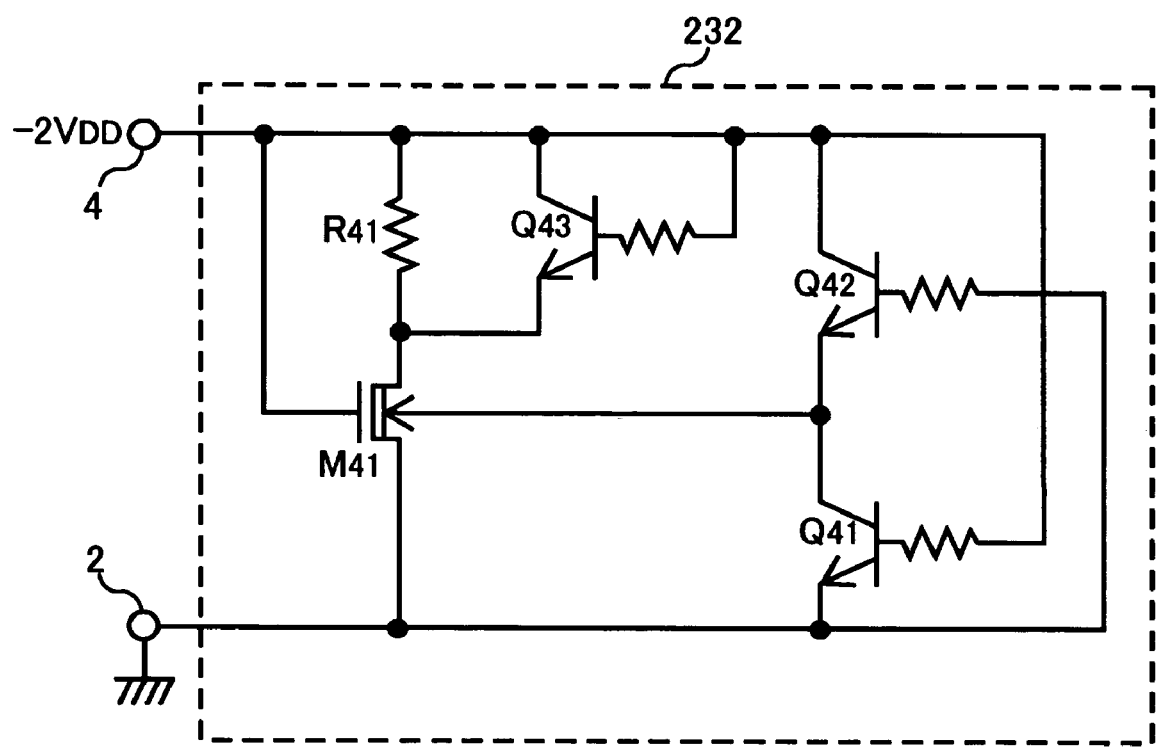
FIG. 5 is a circuit diagram of a latch-up prevention circuit of the charge pump circuit formed in an N-substrate.

In FIG. 5, there is illustrated a latch up preventing circuit 232 of another embodiment according to the invention in which the charge pump circuit 200 has P-channel transistors, each of which has a back gate of N-substrate and N-channel transistors each of which has a back gate of P-well on the N-substrate. A depletion N-channel MOS transistor M41 and a resistor R41 are serially connected between the negative output terminal 4 and the ground terminal 2. A bidirectional NPN transistor Q41 is connected between the back gate of the MOS transistor M41 and the ground terminal 2 and a bidirectional NPN transistor Q42 is connected between the back gate of the MOS transistor M41 and the negative output terminal 4 to switch the connection to the back gate between the terminal 4 and the ground terminal 2.

A bidirectional NPN transistor Q43 is connected between the both ends of the resistor R41 to bypass the resistor R41. The gate of the MOS transistor M41 and the bases of the transistors Q41, 43 are connected with the negative output terminal 4. The base of the transistors Q42 is connected with the ground terminal 2. The explanation of operation of the latch-up prevention circuit 232 is omitted as it is substantially the same as the latch-up prevention circuit 231.

As discussed above, the charge pump circuit 200 has the latch-up preventing circuit 231 or 232 arranged between the negative output terminal 4 and the ground terminal 2. When the voltage of the negative output terminal 4 is raised toward VDD, the negative output terminal 4 and the ground terminal 2 are connected with low impedance via the MOS transistor M31 or M41 and transistor Q33 or Q43. Hence, the voltage of the negative output terminal 4 is raised only slightly. Therefore, the thyristor operation of parasitic transistors is prevented without using an external schottky diode.

Although the above described charge pump circuit has the positive input and the latch-up prevention circuit to connect a negative output and ground, alternately, it may have the negative input and a latch-up prevention circuit to connect a positive output and ground.

It is apparent that the present invention is not limited to the above embodiment and it may be modified and changed without departing from the scope and spirit of the invention.

What is claimed is:

1. A charge pump circuit, integrated in a semiconductor substrate, generating a first output voltage and a second output voltage from an input voltage, a sign of the first output voltage being the same as the input voltage, a sign of the second output voltage being different from the input voltage, and absolute values of the output voltages are larger than the input voltage, the charge pump circuit comprising:
- an output terminal of the second output voltage; and
- a latch-up prevention circuit, embedded in the semiconductor substrate, including a depletion MOS transistor which connects the output terminal to a ground at startup of the charge pump circuit.

2. The charge pump circuit of claim 1, wherein the latch-up prevention circuit further comprises:
- a resistor serially connected with the depletion MOS transistor between the output terminal and the ground;
- a first bidirectional bipolar transistor to connect a back gate of the depletion MOS transistor to the ground;
- a second bidirectional bipolar transistor to connect the back gate of the depletion MOS transistor to the output terminal; and
- a third bidirectional bipolar transistor to bypass the resistor.

3. The charge pump circuit of claim 2, wherein the sign of the input voltage is positive and the sign of the second output voltage is negative,
- the semiconductor substrate includes a P-substrate,
- the voltage of the substrate includes the voltage of the output terminal,
- the depletion MOS transistor includes a P-channel transistor and the bipolar transistors include PNP-transistors,
- the depletion MOS transistor is connected between the output terminal and the resistor,
- a base of the first bidirectional bipolar transistor is connected to the output terminal, and
- a gate of the depletion MOS transistor and bases of the second and third bidirectional bipolar transistors are connected to the ground.

4. The charge pump circuit of claim 2, wherein
- the sign of the input voltage is negative and the sign of the second output voltage is positive,
- the semiconductor substrate includes a N-substrate,
- a voltage of a P-well on the substrate includes the voltage of the output terminal,
- the depletion MOS transistor includes an N-channel transistor and the bipolar transistors include NPN-transistors,
- the depletion MOS transistor is connected between the resistor and the ground,
- a gate of the depletion MOS transistor and bases of the first and third bidirectional bipolar transistors are connected to the output terminal, and
- a base of the second bidirectional bipolar transistor is connected to the ground.

5. A charge pump circuit generating an output voltage from an input voltage, comprising:
- an input terminal receiving the input voltage;
- an output terminal outputting the output voltage;
- a voltage generating circuit generating and providing the output voltage to the output terminal, a sign of the output voltage being different from the input voltage and an absolute value of the output voltage being larger than the input voltage; and
- a latch-up prevention circuit, embedded in a semiconductor substrate, which connects the output terminal to a ground on a condition that the output voltage of the output terminal reaches a predetermined voltage to prevent an increase of the output voltage of the output terminal and a thyristor operation of parasitic transistors,
- wherein said latch-up prevention circuit includes:
  - a depletion MOS transistor which connects the output terminal to the ground at startup of the charge pump circuit.

6. The charge pump circuit of claim 5, wherein the latch-up prevention circuit prevents the increase of the output voltage of the output terminal at startup of the charge pump circuit.

7. The charge pump circuit of claim 5, wherein the depletion MOS transistor connects the output terminal to the ground according to a back gate voltage thereof which varies in accordance with the output voltage of the output terminal.

8. The charge pump circuit of claim 7, wherein the latch-up prevention circuit further includes:
- a resistor serially connected with the depletion MOS transistor between the output terminal and the ground.

9. The charge pump circuit of claim 8, wherein the latch-up prevention circuit further includes:
- a first bidirectional bipolar transistor to connect the back gate of the depletion MOS transistor to the ground and a second bidirectional bipolar transistor to connect a back gate of the depletion MOS transistor to the output terminal.

10. The charge pump circuit of claim 9, wherein the latch-up prevention circuit further includes:
- a third bidirectional bipolar transistor to bypass the resistor.

11. The charge pump circuit of claim 5 further comprising:
- another voltage generating circuit generating and providing another output voltage to another output terminal, a sign of the another output voltage being the same as the input voltage and an absolute value of the another output voltage being larger than the input voltage.

12. The charge pump circuit of claim 5, wherein the latch-up prevention circuit further comprises:
- a first bidirectional bipolar transistor to connect a back gate of the depletion MOS transistor to the ground;
- a second bidirectional bipolar transistor to connect the back gate of the depletion MOS transistor to the output terminal; and
- a third bidirectional bipolar transistor to bypass a resistor coupled in series with the depletion MOS transistor.

13. The charge pump circuit of claim 12, wherein
- the semiconductor substrate includes a P-substrate,
- the voltage of the substrate includes the voltage of the output terminal, and
- the depletion MOS transistor includes a P-channel transistor and the bipolar transistors include PNP-transistors.

14. The charge pump circuit of claim 13, wherein
- the depletion MOS transistor is connected between the output terminal and the resistor,
- a base of the first bidirectional bipolar transistor is connected to the output terminal, and
- a gate of the depletion MOS transistor and bases of the second and third bidirectional bipolar transistors are connected to the ground.

15. The charge pump circuit of claim 12, wherein
- the sign of the input voltage is negative and the sign of the second output voltage is positive,
- the semiconductor substrate includes an N-substrate,
- a voltage of a P-well on the substrate includes the voltage of the output terminal,
- the depletion MOS transistor includes an N-channel transistor and the bipolar transistors include NPN-transistors, the depletion MOS transistor is connected between the resistor and the ground, a gate of the depletion MOS transistor and bases of the first and third bidirectional bipolar transistors are connected to the output terminal, and a base of the second bidirectional bipolar transistor is connected to the ground.

16. A charge pump circuit generating an output voltage from an input voltage, comprising:

an input terminal receiving the input voltage;

an output terminal outputting the output voltage;

a voltage generating circuit generating and providing the output voltage to the output terminal, a sign of the output voltage being different from the input voltage and an absolute value of the output voltage being larger than the input voltage; and a latch-up prevention circuit, embedded in a semiconductor substrate, which connects the output terminal to a ground on a condition that the output voltage of the output terminal reaches a predetermined voltage to prevent an increase of the output voltage of the output terminal and a thyristor operation of parasitic transistors, wherein the latch-up prevention circuit includes:

a depletion MOS transistor to connect the output terminal to the ground in accordance with the output voltage of the output terminal.

* * * * *